US012572252B2

(12) United States Patent
Keenan et al.

(10) Patent No.: US 12,572,252 B2
(45) Date of Patent: Mar. 10, 2026

(54) CONTROLLING A 2D SCREEN INTERFACE APPLICATION IN A MIXED REALITY APPLICATION

(71) Applicant: KONINKLIJKE PHILIPS N.V., Eindhoven (NL)

(72) Inventors: Philip Joseph Keenan, Eindhoven (NL); Molly Lara Flexman, Melrose, MA (US); Benoit Jean-Dominique Bertrand Maurice Mory, Medford, MA (US); Ashish Sattyavrat Panse, Burlington, MA (US); Penelope Eugenia Webb, Somerville, MA (US); Roman Wicky Van Doyer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 30 days.

(21) Appl. No.: 18/021,247

(22) PCT Filed: Sep. 1, 2021

(86) PCT No.: PCT/EP2021/074087
§ 371 (c)(1),
(2) Date: Feb. 14, 2023

(87) PCT Pub. No.: WO2022/053363
PCT Pub. Date: Mar. 17, 2022

(65) Prior Publication Data
US 2024/0019980 A1      Jan. 18, 2024

Related U.S. Application Data

(60) Provisional application No. 63/075,749, filed on Sep. 8, 2020.

(30) Foreign Application Priority Data

Nov. 13, 2020    (EP) ..................................... 20207457

(51) Int. Cl.
G06F 3/04815        (2022.01)
G06F 3/0484         (2022.01)
(Continued)

(52) U.S. Cl.
CPC ........ G06F 3/04815 (2013.01); G06F 3/0484 (2013.01); G06T 11/00 (2013.01);
(Continued)

(58) Field of Classification Search
CPC .. G06F 3/04815; G06F 3/0484; G06F 3/0304; G06V 10/77; G06V 10/945; G06T 11/00; G06T 2200/24
See application file for complete search history.

(56) References Cited

U.S. PATENT DOCUMENTS

| | | | | |
|---|---|---|---|---|
| 8,046,719 | B2 * | 10/2011 | Skourup | G06F 3/011 715/848 |
| 2011/0212717 | A1 * | 9/2011 | Rhoads | G06F 16/9537 455/418 |

(Continued)

FOREIGN PATENT DOCUMENTS

| | | |
|---|---|---|
| CN | 110221894 A | 9/2019 |
| WO | 2018040511 A1 | 3/2018 |

(Continued)

OTHER PUBLICATIONS

Silva et al., "A strategy to present 2D information within a virtual reality application", 2014, 16th Symposium on Virtual & Augmented Reality, pp. 143-147.

(Continued)

*Primary Examiner* — Tamara T Kyle
*Assistant Examiner* — William Wong

(57) ABSTRACT

The present invention relates to controlling a 2D application in a mixed reality application. In order to provide further simplification in terms of operating devices and equipment for the medical personnel, a device (10) for controlling a 2D application in a mixed reality application is provided. The device comprises a 2D application interface (12), a processor (14), a mixed reality application interface (16) and a control interface (18). The 2D application interface receives data representative of a 2D application. The application comprises interactive elements providing commands for user control of the 2D application. The processor identifies and extracts the interactive elements based on the data representative of the 2D application. The processor also translates the interactive elements to user interface features of a mixed reality display application. The processor further generates data for presenting the mixed reality display application and maps user input to commands for user control of the 2D application. The mixed reality application interface provides the mixed reality display application to a user as mixed reality. The control interface receives input from the user for the user interface features and provides the commands to the 2D application in order to control the 2D application. Hence, augmented reality interfaces are mapped to traditional 2D screen interfaces. This allows to integrate applications that only provided the interaction on a monitor with a mouse or the like to be operated in today's augmented reality environment.

17 Claims, 4 Drawing Sheets

(51) Int. Cl.

| | |
|---|---|
| *G06T 11/00* | (2006.01) |
| *G06V 10/77* | (2022.01) |
| *G06V 10/94* | (2022.01) |
| *G06F 3/03* | (2006.01) |

(52) U.S. Cl.
CPC ............ *G06V 10/77* (2022.01); *G06V 10/945* (2022.01); *G06F 3/0304* (2013.01); *G06T 2200/24* (2013.01)

(56) References Cited

U.S. PATENT DOCUMENTS

| 2014/0258918 | A1* | 9/2014 | Morishima | ........... | G06F 3/0481 |
| | | | | | 715/790 |
| 2015/0016777 | A1* | 1/2015 | Abovitz | ............. | G02B 27/0093 |
| | | | | | 385/37 |
| 2016/0225192 | A1 | 8/2016 | Jones et al. | | |
| 2017/0060368 | A1* | 3/2017 | Kochura | ................. | G06F 9/451 |
| 2017/0256096 | A1* | 9/2017 | Faaborg | ............... | G06T 19/003 |
| 2017/0263033 | A1* | 9/2017 | Church | ............... | G06F 3/04815 |
| 2017/0336941 | A1* | 11/2017 | Gribetz | ................... | G06T 19/20 |
| 2017/0357521 | A1* | 12/2017 | Paek | ...................... | G06F 3/0488 |
| 2017/0371405 | A1* | 12/2017 | Kwon | ...................... | G06T 15/40 |
| 2018/0005440 | A1 | 1/2018 | Mullins | | |
| 2018/0053284 | A1* | 2/2018 | Rodriguez | ........... | G06T 3/4007 |
| 2018/0053311 | A1 | 2/2018 | Kuang | | |
| 2018/0322706 | A1* | 11/2018 | Drouin | .................... | G06F 3/011 |
| 2019/0114051 | A1* | 4/2019 | McBeth | .............. | G06F 3/04815 |
| 2020/0038120 | A1 | 2/2020 | Ziraknejad et al. | | |
| 2021/0134065 | A1* | 5/2021 | Ramani | ................. | G06F 3/0346 |
| 2021/0137634 | A1* | 5/2021 | Lang | ...................... | A61B 5/113 |

FOREIGN PATENT DOCUMENTS

| WO | 2018194306 A1 | 10/2018 |
| WO | 2020076856 A1 | 4/2020 |

OTHER PUBLICATIONS

Weng et al., "Graphics, Audio-Visuals and Interaction (GAI) based handheld augmented reality system", Procedia Social and Behavioral Sciences, 97, (2013), pp. 745-752.

Abdallah et al., "Automatic inspection of aeronautical mechanical assemblies by matching the 3D Cad model and real 2D images", Journal of Imaging, 2019, 5, 81, pp. 1-28.

Marner et al., "Mapping 2D input to 3D Immersive Spatial Augmented Reality", downloaded on Feb. 1, 2023, 2 pages.

Geiger et al., "3D-Registered Interaction-Surfaces in Augmented Reality Space", ART 03, downloaded on Feb. 1, 2023, 8 pages.

Ulrich et al., "Display Technologies for Augmented Reality in Medical Applications", Unfallchirurg, Springer, Berlin, DE, vol. 121, No. 4, Feb. 20, 2018 (Feb. 20, 2018), pp. 278-285, XP036468828, ISSN: 0177-5537, DOI: 10.1007/S00113-018-0463-1 [retrieved on Feb. 20, 2018]; https://pubmed.ncbi.nlm.nih.gov/29464292/ includes an English Abstract of this article, downloaded on Feb. 1, 2023.

International Search report and Written Opinion of PCT/EP2021/074087, dated Oct. 8, 2021, 17 pages.

* cited by examiner

CONTROLLING A 2D SCREEN INTERFACE APPLICATION IN A MIXED REALITY APPLICATION

CROSS-REFERENCE TO PRIOR APPLICATIONS

This application is the U.S. National Phase application under 35 U.S.C. § 371 of International Application No. PCT/EP2021/074087, filed on Sep. 1, 2021, which claims the benefit of U.S. Provisional Application No. 63/075,749 filed on Sep. 8, 2020, and European Patent Application No. 20207457.1, filed on Nov. 13, 2020. These applications are hereby incorporated by reference herein.

FIELD OF THE INVENTION

The present invention relates to a device for controlling a 2D application in a mixed reality application, to a system for controlling a 2D application in a mixed reality application and to a method for controlling a 2D application in a mixed reality application.

BACKGROUND OF THE INVENTION

In medical environment, wearable augmented reality enables new opportunities for user interfaces as compared to traditional 2D interfaces. However, those augmented reality interfaces require specific inputs and design requirements in order to be intuitive compared to previous 2D interfaces. It has been shown that traditional 2D interfaces do not integrate into augmented reality tools. This adds to an increasing complexity in the operational room. It also adds to complexity in the users' operational tasks.

SUMMARY OF THE INVENTION

There may thus be a need to provide further simplification in terms of operating devices and equipment for the medical personnel.

The object of the present invention is solved by the subject-matter of the independent claims; further embodiments are incorporated in the dependent claims. It should be noted that the following described aspects of the invention apply also for the device for controlling a 2D application in a mixed reality application, for the system for controlling a 2D application in a mixed reality application and for the method for controlling a 2D application in a mixed reality application.

According to the present invention, a device for controlling a 2D application in a mixed reality application is provided. The device comprises a 2D application interface, a processor, a mixed reality application interface and a control interface. The 2D application interface is configured to receive data representative of a 2D application. The 2D application comprises interactive elements providing commands for user control of the 2D application. The processor is configured to identify and extract the interactive elements based on the data representative of the 2D application. The processor is also configured to translate the interactive elements to user interface features of a mixed reality display application. The processor is further configured to generate data for presenting the mixed reality display application. The processor is still further configured to map user input to commands for user control of the 2D application. The mixed reality application interface is configured to provide the mixed reality display application to a user as mixed reality.

The control interface is configured to receive input from the user for the user interface features. The control interface is also configured to provide the commands to the 2D application in order to control the 2D application.

As a result, it is possible, for example, to stream a 2D screen-based interface into an augmented reality environment while augmented reality specific inputs are based on extracted features from the 2D interface. User interface information is extracted from the 2D interface (including $3^{rd}$ party applications) for use in creating enhanced interaction within augmented reality applications.

According to an example, the 2D application interface is configured to receive display data for presenting the 2D application on a monitor, or a sequence of images of a camera acquiring image data of a presentation of the 2D application.

According to an example, for the identifying and extracting, the processor is configured to provide an interactive elements identification routine comprising at least one of the group of: detecting interaction features based on image processing of the 2D application, detecting changes when moving a position indicator across the 2D application presentation, recording locations of interaction activity by the user in the 2D application presentation and providing training datasets comprising interaction activity and recognizing interactive elements based on machine learning of the training datasets.

According to an example, the processor is configured to create colliders around the identified interactive elements for the translating of the interactive elements to the user interface features. The colliders enable a number of 3D feedback features.

According to the present invention, also a system for controlling a 2D application in a mixed reality application is provided. The system comprises a device for controlling a 2D application in a mixed reality application according to one of the preceding examples. The system also comprises a mixed reality presentation arrangement, which is data-connected to the device for controlling a 2D application in a mixed reality application. The mixed reality presentation arrangement comprises a presentation device that is configured to present the mixed reality display application to a user as mixed reality. The mixed reality presentation arrangement further comprises a user input device.

According to an example, the mixed reality presentation arrangement is an augmented reality presentation arrangement that comprises a wearable augmented reality device. In an option, provided in addition or alternatively, a head-mounted display is provided configured to present the mixed reality display application as an overlay to the reality.

According to an example, the mixed reality presentation arrangement is a mixed reality presentation arrangement that comprises a wearable mixed reality device. In an option, provided in addition or alternatively, a head-mounted display is provided configured to present the virtual reality display application.

According to an example, the mixed reality presentation arrangement is a virtual reality presentation arrangement that comprises a wearable virtual reality device. In an option, provided in addition or alternatively, a head-mounted display is provided configured to present the virtual reality display application.

According to an example, a monitor is provided configured to present the 2D application. In an option, provided in addition or alternatively, an interface is provided to forward user interaction data to the 2D application. The user interaction data is provided by the user input device of the mixed reality presentation arrangement.

According to the present invention, also a method for controlling a 2D application in a mixed reality application is provided. The method comprises the following steps:

receiving data representative of a 2D application, wherein the 2D graphical user interface comprises interactive elements providing commands for user control of the 2D application;

identifying and extracting the interactive elements based on the data representative of the 2D application;

translating the interactive elements to user interface features of a mixed reality display application;

generating and providing data for presenting the mixed reality display application to a user as mixed reality, wherein the mixed reality display application comprises a presentation of the 2D application;

receiving input from the user for the user interface features;

mapping the user input to commands for user control of the 2D application; and providing the commands to the 2D application in order to control the 2D application.

In an aspect, the data used for the presentation of the 2D application is used to extract the respective user interface elements that are usually displayed to the user as 2D presentation. The interface elements of the 2D world are translated into user interface features of a mixed reality world. The user provides input in the mixed reality world and the input is mapped back into the 2D world to control the 2D application.

Basically, a program is provided that uses an input system to simulate user input to detect interactable interfaces from 2D screens without integrating with existing software. In other words, an input system is used to simulate user input to detect the interactable interfaces from 2D screens without integrating with the interactable source at a software level.

In an aspect, the use of augmented reality is applied to display screens and an interaction with those screens is provided. An example of the field of use is healthcare, for example in the context of wearable augmented reality devices and the application of other 2D applications.

According to an aspect, a device for controlling a 2D application in a mixed reality application is provided with a 2D application interface, a processor, a mixed reality application interface and a control interface. The 2D application interface receives data representative of a 2D application. The application comprises interactive elements providing commands for user control of the 2D application. The processor identifies and extracts the interactive elements based on the data representative of the 2D application. The processor also translates the interactive elements to user interface features of a mixed reality display application. The processor further generates data for presenting the mixed reality display application and maps user input to commands for user control of the 2D application. The mixed reality application interface provides the mixed reality display application to a user as mixed reality. The control interface receives input from the user for the user interface features and provides the commands to the 2D application in order to control the 2D application. Hence, augmented reality interfaces are mapped to traditional 2D screen interfaces. This allows to integrate applications that only provided the interaction on a monitor with a mouse or the like to be operated in today's augmented reality environment.

The integration of the 2D application into mixed or augmented reality is suitable for example for interventional guided therapy systems.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
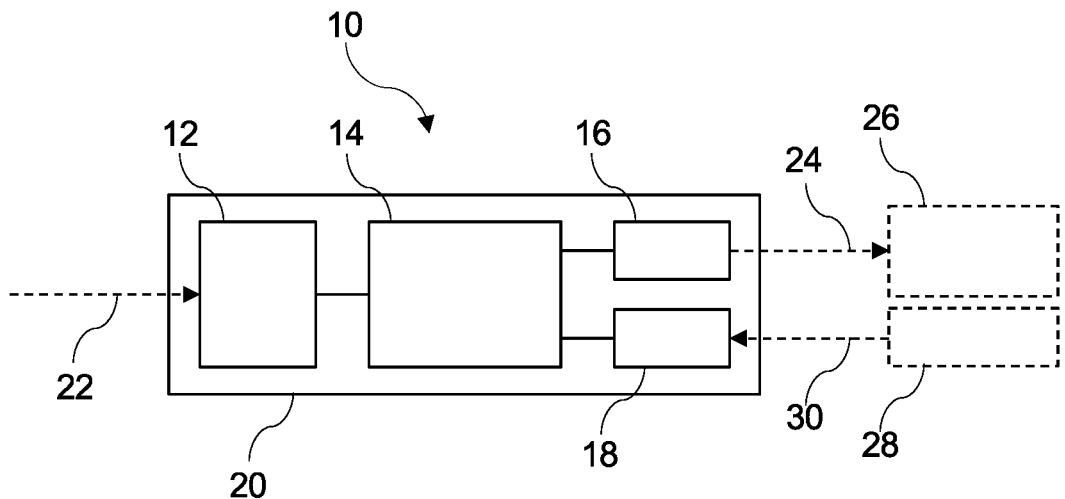
FIG. 1 schematically shows an example of a device for controlling a 2D application in a mixed reality application.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows an example of a device 10 for controlling a 2D application in a mixed reality application. The device 10 comprises a 2D application interface 12, a processor 14, a mixed reality application interface 16 and a control interface 18. The 2D application interface 12 is configured to receive data representative of a 2D application. The 2D application comprises interactive elements providing commands for user control of the 2D application. The processor 14 is configured to identify and extract the interactive elements based on the data representative of the 2D application. The processor 14 is also configured to translate the interactive elements to user interface features of a mixed reality display application. The processor 14 is further configured to generate data for presenting the mixed reality display application; and to map user input to commands for user control of the 2D application. The mixed reality application interface 16 is configured to provide the mixed reality display application to a user as mixed reality. The control interface 18 is configured to receive input from the user for the user interface features. The control interface 18 is also configured to provide the commands to the 2D application in order to control the 2D application.

The 2D application interface 12, the processor 14, the mixed reality application interface 16 and the control interface 18 may be provided integrated in a common structure as indicated with frame 20. However, they may also be provided as separate components.

A first hashed arrow indicates the provision or supply from the 2D application that is entering the 2D application interface 12.

A second hashed arrow indicates the output from the mixed reality application interface 16 to the mixed reality display application, which is indicated as an option with a first hashed frame 26.

A second hashed frame 28 indicates the user input device as an option. A third hashed arrow 30 indicates the provision from the user input device to the control interface 18.

The 2D application interface relates to an input interface for providing the data of the 2D application that is used for presenting the 2D application. The 2D application interface can also be referred to as 2D display application interface or 2D application interface input. The 2D application interface can also be referred to as screen interface or monitor interface.

The 2D application interface may be provided as an interface that takes screen content from a native 2D application and sends it to the augmented reality application. This can be implemented as a frame-grabber or via proprietary data interfaces.

The processor provides data processing. The processor can also be referred to as computing arrangement or controller.

In example, the processor performs the following key tasks: Identifying user interaction elements in the native application screen, translating those user interaction elements into augmented reality user interaction elements having predefined colliders, and setting properties of the colliders based on the augmented reality user interaction rules. As an option, the processor also performs mapping user input towards augmented reality user interaction elements into an input that can be fed back to the native application.

The mixed reality application interface relates to an output interface for providing the data used for presenting the mixed reality display application. The mixed reality application interface can also be referred to as mixed reality display data supply or mixed reality presentation output.

The control interface relates to an input interface for the input from the user for the user interface features. The control interface also relates to an output interface for the commands to control the application. The control interface thus provides the interface function in two directions: From the user towards the mixed reality application interface and from the mixed reality application (and this from the user) to the 2D application.

The control interface, or user interface controller, may be provided as an application that is part of the augmented reality application that extracts user interaction features from the native 2D application screen and translates them to augmented reality display user interaction features. Similarly, the user interaction controller can map back augmented reality display user interaction commands back to commands to the native 2D application via the control interface.

The control interface may be provided as an interface that can input user commands back to the native 2D application. This can be implemented via mouse control (position and button down/up), keyboard input, touch screen input, voice input, etc.

In an example, the mixed reality relates to augmented reality that comprises a reality view that is augmented with additional information.

In an example, the mixed reality relates to augmented virtuality that comprises a virtual view that is augmented with additional information.

In an example, the mixed reality relates to virtual reality that comprises a virtual view.

The data representative of a 2D application can also be referred to as data representative of a 2D graphical user interface of a 2D application.

The 2D application can also be referred to as native application or 2D legacy content.

In an example, the 2D application runs with traditional 2D screens and interfaces, such as an echo-navigator, interventional ultrasound, hemodynamics, Azurion Image Review and 3rd party applications such as optic coherence tomography, electrophysiological mapping and the like.

In an example, a 2D application is provided as an application that is displayed on a 2D display. However, for example, it is provided that the 2D display also displays multi-dimensional data.

The mixed reality application, such as an augmented reality application or a virtual reality application may be provided as an application that generates the content displayed on the augmented reality display. This application may reside on the augmented reality display itself, or on a separate computing device that sends content to the display.

In an example, a native application sends images and receives user input via an interface with the augmented reality application. The augmented reality application has a user interaction controller that is responsible for extracting user interaction features from the native application screen and then translates them to augmented reality display user interaction features. The user interaction controller also maps augmented reality interactions back to commands to the native application via the control interface.

In an example, the device provides an analysis of the 2D application and its interaction possibilities and then a translation into gestures.

In an example, it is provided to take into account gestures of the current context. For example, the context of the operation is provided as input to determine gestures relevant for user interaction or gestures less appropriate for user interaction.

As an example, not further illustrated, it is provided that the 2D application interface is configured to receive: i) display data for presenting the 2D application on a monitor; or ii) a sequence of images of a camera acquiring image data of a presentation of the 2D application.

As an example, not further illustrated, for the identifying and extracting, it is provided that the processor 14 is configured to provide an interactive elements identification routine comprising at least one of the group of: detecting interaction features based on image processing of the 2D application; detecting changes when moving a position indicator across the 2D application presentation; recording locations of interaction activity by the user in the 2D application presentation; and providing training datasets comprising interaction activity and recognizing interactive elements based on machine learning of the training datasets.

In order to create custom augmented reality user interaction elements, user interaction elements in the native application must be identified.

In an example, the native application sends information about its user interaction elements to the augmented reality application.

In another example, the processor runs a user interaction identification routine for any native application it encounters. This initialization routine can be run every time the processor sees a change in the input screen. This initialization routine can also be run on startup of the augmented reality application and/or the native application. This initialization routine can also be run periodically as a calibration step.

In a further example, the user interaction controller runs the user interaction identification routine in real-time based on where the user is looking or interacting with a screen.

The user interaction or user interface identification routine can be implemented in multiple ways:

In a first example, image processing is provided to detect button-like features in the display content as provided by the 2D application. For example, edges, changes in color for buttons etc. are detected in the image content. The image content refers to the presentation of the content on a screen. The image content can also refer to the image data as provided by the 2D application for the presentation on a screen.

In a second example, a routine is provided that moves the mouse across pixels and looks for changes in the interface. The mouse movement can be provided automatically. The changes refer to e.g. visual changes that are common for indicating user interaction possibilities to the user. Again, this can be done on the presentation as shown on the monitor or based on the data as provided by the application.

In a third example, a routine is provided that uses machine learning to recognize buttons based on training datasets that consist of clicks where users interact with the interfaces.

In a fourth example, a routine is provided that records locations of button clicks by the user over time and recalls the locations of those button clicks with regards to the screen display.

Figure 2:
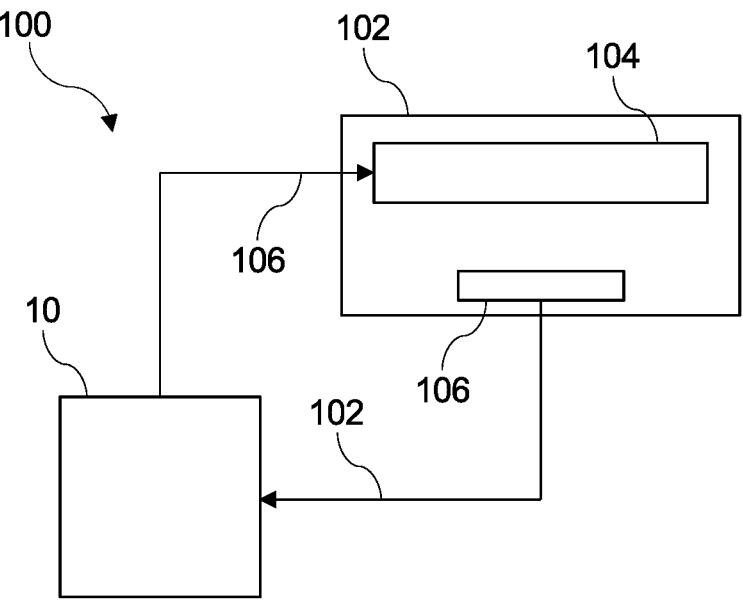
FIG. 2 schematically shows an example of a system for controlling a 2D application in a mixed reality application.

FIG. 2 schematically shows an example of a system 100 for controlling a 2D application in a mixed reality application. The system 100 comprises an example of the device 10 for controlling a 2D application in a mixed reality application according to one of the examples described above and below. The system 100 also comprises a mixed reality presentation arrangement 102, which is data-connected to the device for controlling a 2D application in a mixed reality application. The mixed reality presentation arrangement 102 comprises a presentation device 104 that is configured to present the mixed reality display application to a user as mixed reality. The mixed reality presentation arrangement 104 further comprises a user input device 106.

As an example, 2D screens can be used in image guided therapy together with augmented reality wearables which improves ergonomics and flexibility within the interventional suite. Staff within the room can maintain to rely on the 2D screens, such as the Flexvision, in order to receive information from systems in the room. However, by transferring their information presentation and interaction into the augmented reality, these screens can be moved aside or can even be omitted such that they no longer take up space in the room and it is also no longer required that their position accounts for sterility and for the position of multiple staff members and other equipment. Providing the screens in augmented reality enables the staff members to work in a more flexible environment as they are not restricted to viewing the screens at awkward and suboptimal positions. The combination of the 2D screen content in the augmented reality world thus facilitates the work for staff members. Also, the adding of multiple screens to the room can be avoided. These advantageous effects are caused by the visualization of information through virtual screens via an augmented reality wearable that alleviates the cumbersome issues experiences so far.

The visualization of information through virtual screens via an augmented reality wearable together with the feedback and interaction possibility addresses the need for providing flexible screens for visualization to the user for improving ergonomics and flexibility in the interventional suite. The visualization of information through virtual screens via an augmented reality wearable together with the feedback and interaction possibility further also addresses the need for interaction with those streams of information. Examples for user interfaces are touch screen modules, table side controller or traditional interfaces in form of a mouse and keyboard.

In an example, not further shown, the mixed reality presentation comprises a presentation of the 2D application.

Figure 3:
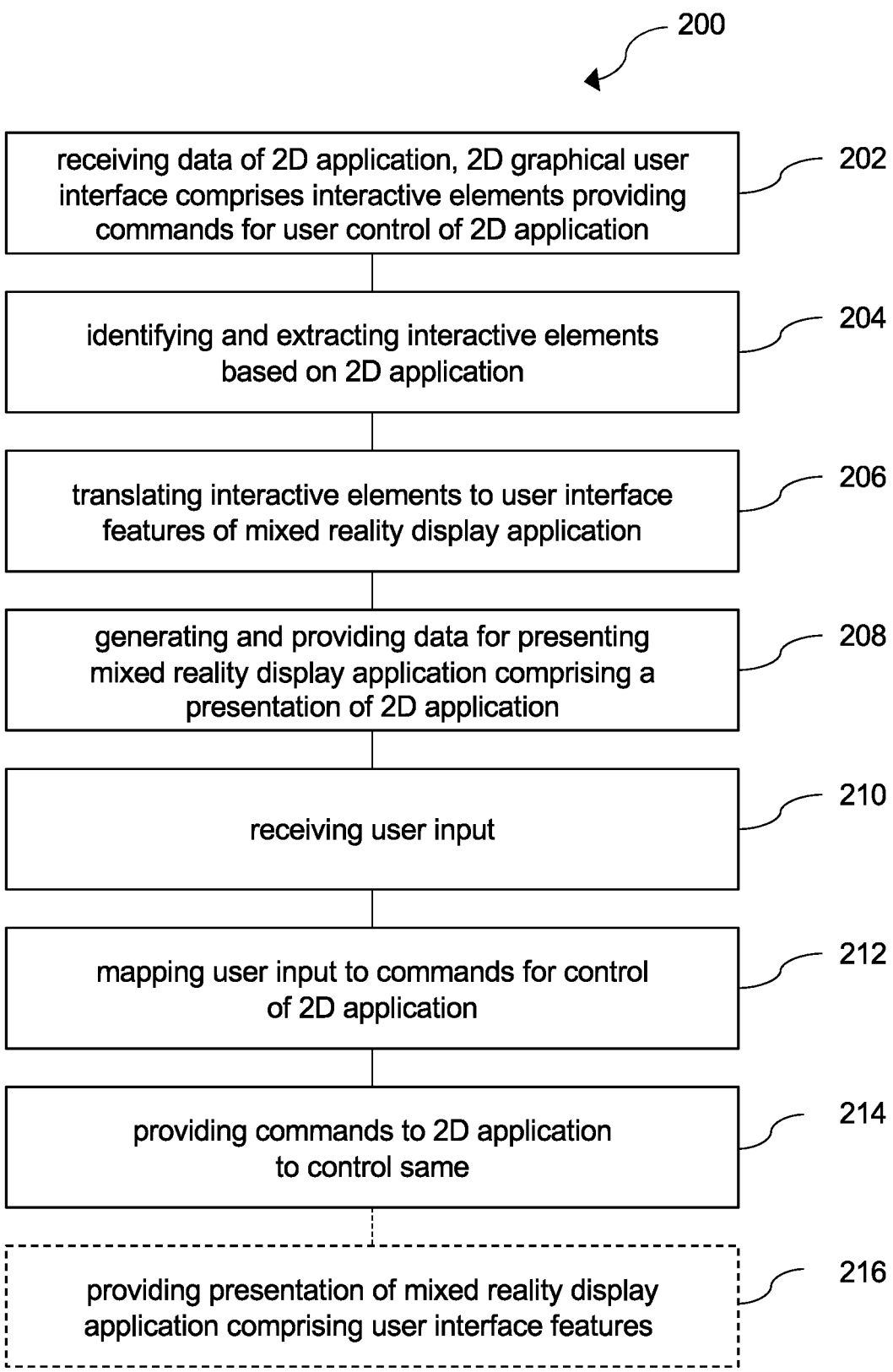
FIG. 3 shows basic steps of an example of a method for controlling a 2D application in a mixed reality application.

FIG. 3 shows basic steps of an example of a method 200 for controlling a 2D application in a mixed reality application. The method 200 comprises the following steps: In a first step 202, data representative of a 2D application is received. The 2D graphical user interface comprises interactive elements providing commands for user control of the 2D application. In a second step 204, the interactive elements are identified and extracted based on the data representative of the 2D application. In a third step 206, the interactive elements are translated to user interface features of a mixed reality display application. In a fourth step 208, data for presenting the mixed reality display application to a user is generating and provided as mixed reality. The mixed reality display application comprises a presentation of the 2D application. In a fifth step 210, input from the user for the user interface features is received. In a sixth step 212, the user input is mapped to commands for user control of the 2D application. In a seventh step 214, the commands are provided to the 2D application in order to control the 2D application.

As an option, indicated in FIG. 3 with hashed lines, it is further provided an 8$^{th}$ step 216 of providing a presentation of the mixed reality display application comprising the user interface features. The user input is based on the presentation of the mixed reality display application.

In an example, it is provided to move the interactions anywhere in space and it is not restricted to the interaction elements on the screen that is being streamed to the headset.

In an example, not further shown in detail, the translating of the interactive elements to the user interface features comprises creating colliders around the identified interactive elements. The colliders enable a number of 3D feedback features.

In an example, the data representative of the 2D application comprises display data for presenting the 2D application on a monitor.

In an example, the data representative of the 2D application is provided as a sequence of images of a camera acquiring image data of a presentation of the 2D application.

In an example, for the identifying and extracting, it is provided an interactive elements identification routine comprising at least one of the group of:

detecting button-like features based on image processing of the displayed 2D application;

moving a mouse-pointer or the like across the presentation of the 2D application and detecting changes in the 2D graphical user interface;

recording locations of button clicks by the user in the 2D graphical user interface and recalling the locations of those buttons with regard to the 2D display;

providing training datasets comprising clicks where a user interacts with the interactive elements and recognizing interactive elements based on machine learning of the training datasets.

Augmented reality generally refers to when a live image stream is supplemented with additional computer-generated information. The live image stream can be via the eye, cameras, smart phones, tablets, etc. This image stream is augmented via display to the user that can be done via glasses, contact lenses, projections or on the live image stream device itself (smart phone, tablet, etc.). The present examples can be applied to any implementation of augmented reality that overlays virtual objects on the real world. In principal, this can also be extended to virtual reality. Examples for augmented reality devices or virtual reality devices include the Microsoft HoloLens®, or devices from Magic Leap®, Vuzix®, or NReal®.

The processor, also referred to as user interaction controller, or user interface controller, provides the translation of the interactive elements of the 2D application to user interface features of the mixed reality display application.

As an example, colliders are created around the user interaction objects in the screen. Those colliders can then be used to enable a number of augmented reality user interaction features. For example, the cursor style changes when over a user interaction element. Another example is providing audio feedback to the user when hovering, clicking or touching a user interaction element. A further example is providing visual feedback to the user when they are hovering, clicking, or touching a user interaction element. An example is also to provide haptic feedback to the user, for example via the augmented reality interface, indicating that they are interacting with a user interaction element.

A still further example is to magnify an interaction element like a button when the user is interacting with the user interaction element. For example, it can also be provided to allow the user a direct touch 3D interaction with a 2D element, e.g. direct touch 'press' of a button.

Another example is to provide gaze control and to implement dwell button press functionality. For eye gaze, the processor can provide a minimum spacing between elements to facilitate control by the user.

The processor thus translates user interfaces that were designed for a 2D screen and interaction with a mouse and keyboard into a user interface that can accommodate gesture, eye gaze, head interaction, voice commands, etc.

The processor can be provided with augmented reality user interface design rules such as minimum spacing between colliders, which is helpful for eye-gaze based button selection, Another example for an augmented reality user interface design rule is to provide depths of colliders, which can be provided, for example, for direct touch interaction 2D colliders that require a 3D depth to allow for interaction. As a further rule, minimum or maximum size of a button can be determined. For example, a button must be of a minimum size to enable someone to select it with eye gaze or head pose. The minimum size is also dependent on how far away the button is from the user. A further rule can be to provide gravity wells, which are helpful in eye gaze, where a gravity well can make it harder to look off a button to an adjacent button. This helps to retain gaze on a selected object and avoid flickering between objects.

An example is further to provide head pose control and tab button press.

The mapping relates to assign and translate user input towards augmented reality user interaction elements into an input that can be fed back to the native application. For example, if the native application can only accept mouse position and state (up/down), then the processor must map the augmented reality user interaction into those simplified interaction. As an example, mouse position can be controlled the user by Head pose ray projection onto 2D virtual screen and to move the mouse up or down, pinch gesture state can be used, or a voice command 'mouse down', 'mouse up' or 'select'. Another example for mouse position is to use eye gaze ray projection onto 2D virtual screen. To provide dwell for three seconds may be provided for further improvement. A still further example is to use voice command mapped to pixel position. To move the mouse up or down, voice command of button can be applied. A further example is to provide a button collider and to move the mouse, collision between index finger position and button collider is provided.

In a further option, augmented reality user interaction elements are provided by generating and mapping voice commands to a specific pixel location in the screen. This can be provided by parsing the 'labels' that appear on mouse-over for some interfaces. This can also be provided by parsing the names of buttons as the appear on the interface. This can also be provided by allowing the user to label an augmented reality user interaction button, for example looking at it and saying: create voice label "pause" or through a separate offline augmented reality user interaction tool that allows the user to delineate buttons and populate a list of voice commands for that button. This can also be provided by having an interface that can send the voice label-to-pixel mapping from the native application. This can also be provided by having an interface that can create a voice label to a sequence of repeated button presses. For example, in case of an image review screen where there is a next frame button, a new voice label "skip five frames" infers pressing the next frame button five times.

In an aspect, the data used for the presentation of the 2D application is used to extract the respective user interface elements that are usually displayed to the user as 2D presentation. The interface elements of the 2D world are translated into user interface features of a mixed reality world. The user provides input in the mixed reality world and the input is mapped back into the 2D world to control the 2D application.

Basically, a program is provided that uses an input system to simulate user input to detect interactable interfaces from 2D screens without integrating with existing software. In other words, an input system is used to simulate user input to detect the interactable interfaces from 2D screens without integrating with the interactable source at a software level.

In an aspect, the use of augmented reality is applied to display screens and an interaction with those screens is provided. An example of the field of use is healthcare, for example in the context of wearable augmented reality devices and the application of other 2D applications.

The integration of the 2D application into mixed or augmented reality is suitable for example for interventional guided therapy systems.

Figure 4:
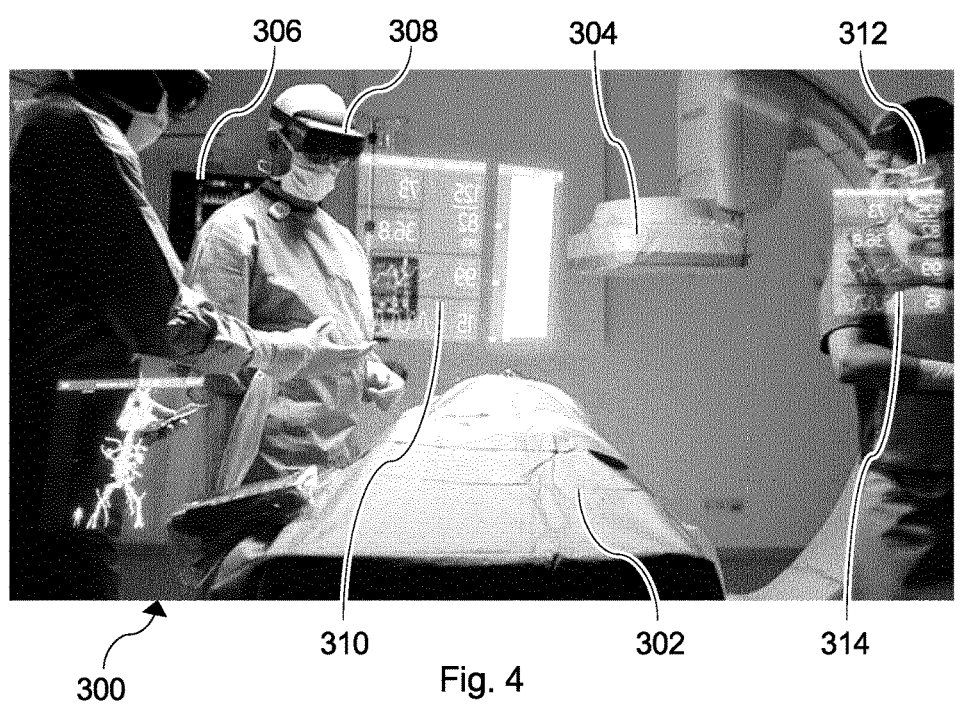
FIG. 4 illustrates a scenery in an operation room and the use of the system for controlling a 2D application in a mixed reality application.

FIG. 4 illustrates a scenery 300 in an operation room and the use of the system for controlling a 2D application in a mixed reality application. A subject 302 is arranged on a subject support. An X-ray imaging system 304 may be provided, such as a C-arm imaging system. A monitor arrangement 306 is provided in the background showing the content of a traditional 2D application with the option of an interface in form of a mouse or the like. A first staff member is wearing a first head-mounted augmented reality device 308. The first user is provided with the content of the 2D application in form of an augmented reality presentation 310 and to interact and thus control the 2D application with the augmented reality device. In an option, the monitor in the background is omitted. As an option, a second staff member is wearing a second head-mounted augmented reality device 312. The second user is provided with the same or different content of the 2D application in form of an augmented reality presentation 314 and to interact and thus control the 2D application with the augmented reality device.

In an option, the mixed reality presentation arrangement is an augmented reality presentation arrangement that comprises a wearable augmented reality device. As an option, a head-mounted display like the first head-mounted augmented reality device 308 or the second head-mounted augmented reality device 312 is provided configured to present the mixed reality display application as an overlay to the reality.

An example for an augmented reality display is a head-mounted display worn by at least one person in the interventional suite. This could alternatively be a see-through screen, such as a heads-up-display using the lead shield. This could also be similar to RealView™ holographic display. A further option is a virtual reality display.

In an example, a HoloLens® is provided to display a virtual screen. The augmented reality application that generates the content of the virtual screen comprises a frame-grabber that grabs the screen output from the native application via a DVI-out interface. The user interaction controller interprets the virtual screen from the frame-grabber and generates additional user interaction elements such as colliders and user interaction rules that are specific to augmented reality. The user interaction controller translates user input into the virtual screen and maps it to mouse input to the native application.

In an option, provided in addition or alternatively, the mixed reality presentation arrangement is a virtual reality presentation arrangement that comprises a wearable virtual reality device. As an option, a head-mounted display is provided configured to present the virtual reality display application.

In an option of the system, an example of the augmented reality presentation arrangement is used by at least one staff member and an example of the virtual reality presentation arrangement is used by least one further staff member.

As an example, not further shown in detail, a monitor like the monitor arrangement 306 is provided configured to present the 2D application. As an option, an interface is provided to forward user interaction data to the 2D application. The user interaction data is provided by the user input device of the mixed reality presentation arrangement.

In case of an augmented reality application, in an example it is provided to present the mixed reality display application such that it is overlaid to the monitor showing the real 2D application.

In case of a virtual reality application, in an example it is provided to present a presentation of the monitor in the virtual world in the same spatial position (within the context of the room shown in the virtual presentation) as in reality.

As an example, at least one of the following group is provided for user interaction in the mixed reality presentation arrangement: gesture recognition comprising recognition of moved totems; voice commands; head tracking; eye tracking; and external devices comprising controllers, remotes and keyboards.

Figure 5:
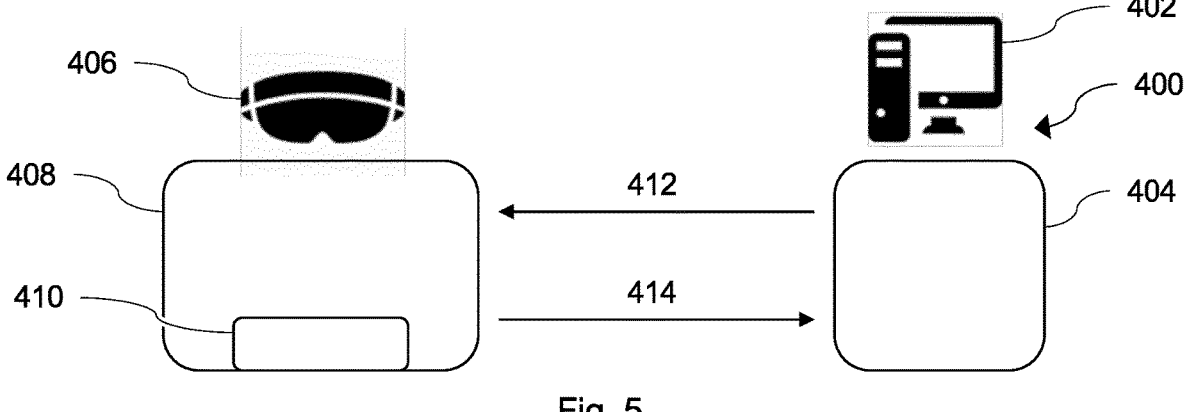
FIG. 5 schematically shows a further setup for controlling a 2D application in a mixed reality application.

FIG. 5 schematically shows a further setup 400 for controlling a 2D application in a mixed reality application. A computer-monitor arrangement 402 is indicated. A native application 404 is provided to be run on the computer-monitor arrangement 402. A head-mounted augmented reality device 406 is indicated for running an augmented reality application 408. A user interaction (or user interface) controller 410 is provided. A first arrow 412 indicates a screen interface and a second arrow 414 indicates a control interface.

Figure 6:
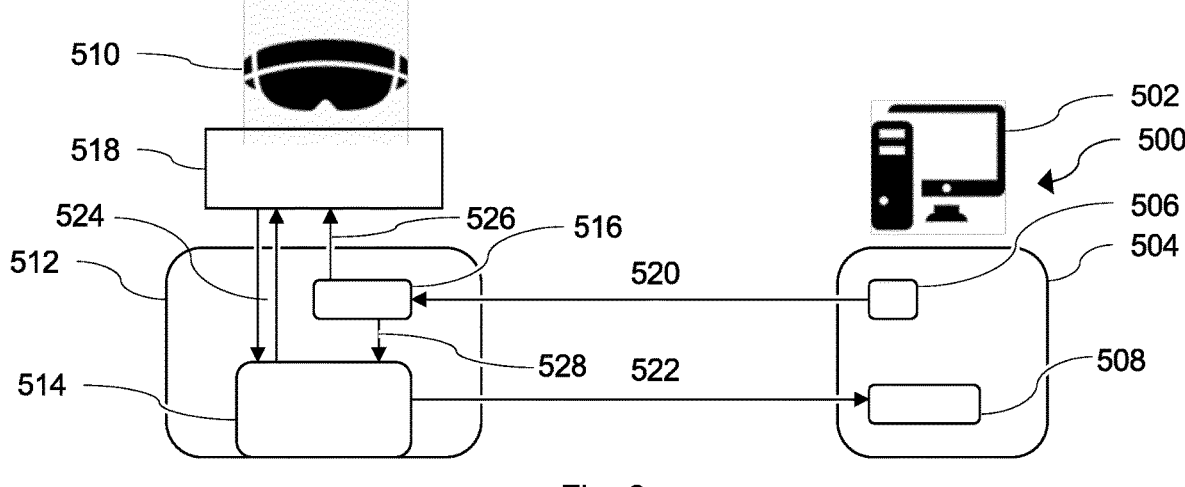
FIG. 6 schematically shows another setup for controlling a 2D application in a mixed reality application.

FIG. 6 schematically shows another setup 500 for controlling a 2D application in a mixed reality application. A computer-monitor arrangement 502 is indicated. A native application 504 is provided to be run on the computer-monitor arrangement 502. A display video output 506 is provided and a mouse input 508. Further, a head-mounted augmented reality device 510 is indicated for running an augmented reality application 512. A user interaction (or user interface) controller 514 is provided. Further, a frame grabber 516 is indicated and a virtual screen 518. A first arrow 520 indicates a first interface from the display video output 506 to the frame grabber 516; and a second arrow 522 indicates a second interface from the to the user interaction controller 514 to the mouse input 508. A second, bi-direction interface 524 is indicated between the user interaction controller 514 and the virtual screen 518. A further arrow 526 indicates the interface between the Fran grabber 516 and the virtual screen 518. A still further arrow 528 indicates the interface between the frame grabber 516 and the user interaction controller 514.

Figure 7:
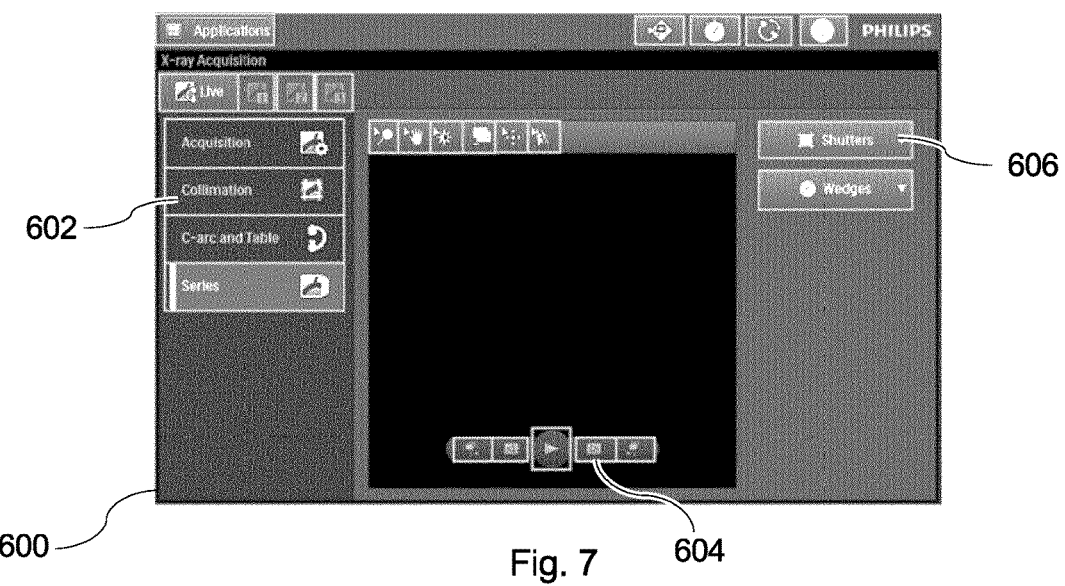
FIG. 7 illustrates an example of an enhanced augmented reality user interface with colliders shown with frames in bright lines.

FIG. 7 illustrates an example of an enhanced augmented reality user interface 600 with colliders 602, 604 and 606 shown with frames in bright lines for the respective user interface portions of the 2D application.

Figure 8:
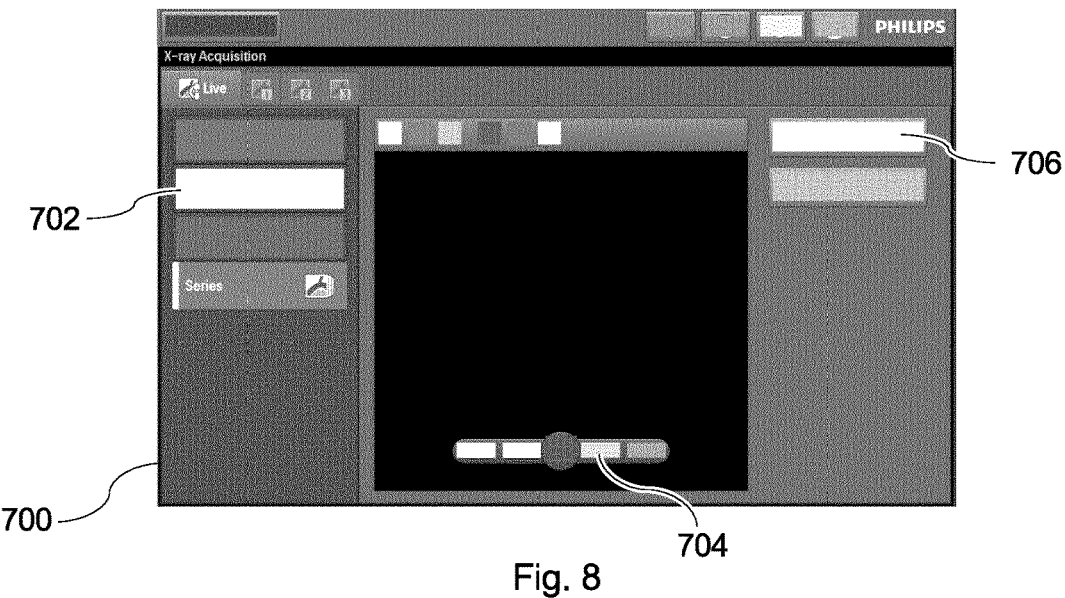
FIG. 8 illustrates an example of a translation of user interface elements into augmented reality user interface elements.

FIG. 8 illustrates a user interface 700 with examples of a translation of user interface elements into augmented reality user interface elements 702, 704 and 706.

Figure 9:
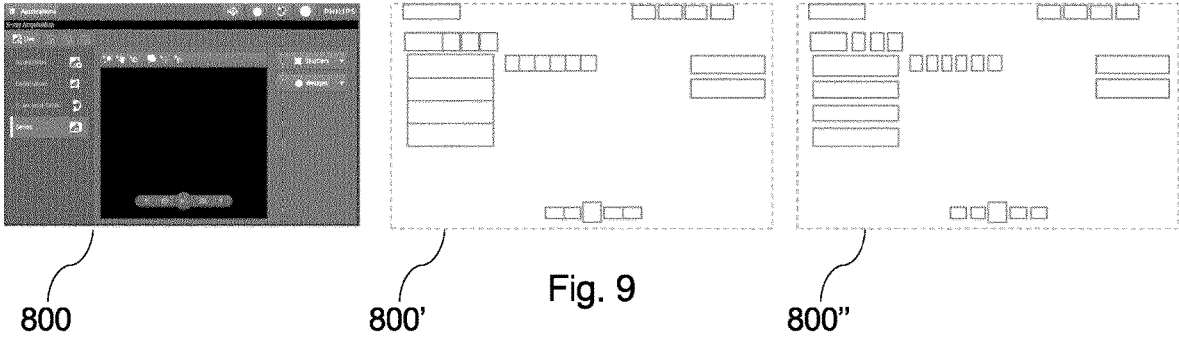
FIG. 9 illustrates an example of a 2D screen user interface in the left part, extracted button locations translated into augmented colliders in the middle part and an augmented reality user interface design rule of minimum button spacing requirement for eye gaze in the right part.

FIG. 9 illustrates an example of a 2D screen user interface 800 in the left part, extracted button locations translated into augmented colliders in the middle part 800' and an augmented reality user interface design rule of minimum button spacing requirement for eye gaze in the right part 800".

As an example, not further illustrated, the processor is configured to create colliders around the identified interactive elements for the translating of the interactive elements to the user interface features. The colliders enable a number of 3D feedback features.

In an option, the processor is configured to provide gravity wells at identified interactive elements to help a user to hold an eye gaze onto a location of an interactive element.

Wearable augmented reality provides a unique set of interactions for the user. By transferring the interaction with the 2D application into the augmented reality (or mixed reality) it is possible to interact with legacy 2D content. Although a screen is streamed into the augmented reality application without accompanying information about the available interactions and user interface elements, the user can interact with that screen, for example, to indirectly push a button. The transfer provides the knowledge of the location of interactors within the augmented reality environment which increases the functionality and practical usability of the system. As an example, eye tracking interaction is enabled. As an improvement, gravity wells can be created that help a user to hold their gaze onto a specific location in order to select or click on something by eye gaze. Based on the knowledge of where the gravity wells should reside within the interface, this type of functionality is also provided in an option.

Based on the identification and extraction of the user interface interactors of the 2D application into the augmented reality application, 3rd party interfaces and interactors can be integrated into the augmented reality system. The identification and extraction also ensure that updates of the 2D application interfaces and all possible configurations of that particular interface are also reflected in the augmented reality application.

The identification and extraction provide a dynamic extraction of information from 2D interfaces and to use that information to enhance augmented reality interactions. This enables a plurality of interaction types, e.g. eye gaze, and therefore improves the user experience, increases efficiency of interactions and reduces errors when interacting with 2D systems.

The term "subject" may also be referred to as individual. The "subject" may further also be referred to as patient, although it is noted that this term does not indicate whether any illness or disease is actually present with the subject.

In an example, a computer program or program element for controlling an apparatus according to one of the examples above is provided, which program or program element, when being executed by a processing unit, is adapted to perform the method steps of one of the method examples above. In another exemplary embodiment of the present invention, a computer program or a computer program element is provided that is characterized by being adapted to execute the method steps of the method according to one of the preceding embodiments, on an appropriate system.

The computer program element might therefore be stored on a computer unit or be distributed over more than one computer units, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

As discussed above, the processing unit, for instance a controller, implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated, and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A device for controlling a 2D application in a mixed reality application, the device comprising:
   a processor in communication with memory, the processor configured to:
   receive data representative of a 2D application, wherein the 2D application comprises interactive elements that provide commands for user control of the 2D application;
   identify and extract the interactive elements in the 2D application, based on the data representative of the 2D application, by executing an interactive elements identification routine comprising:
      detecting the interactive elements based on image processing of the 2D application;
      detecting changes in the 2D application when moving a position indicator amongst the interactive elements in the 2D application;
      recording locations of interaction activity by the user with the interactive elements in the 2D application; and
      providing a training dataset comprising the interaction activity and recognizing the interactive elements in the 2D application based on machine learning of the training dataset;
   translate the interactive elements to user interface features of a mixed reality display application, wherein translation comprises creating one or more colliders around one or more of the interactive elements;
   present the mixed reality display application with the user interface features to users as mixed reality;
   receive user input for one or more of the user interface features of the mixed reality display application;
   map i) the user input for the user interface features of the mixed reality display application to ii) the commands provided by the interactive elements of the 2D application for user control of the 2D application; and
   provide the commands to the 2D application in order to control the 2D application.

2. The device according to claim 1, wherein the processor is further configured to receive:
   display data for presenting the 2D application on a monitor; or
   a sequence of images of a camera acquiring image data of a presentation of the 2D application.

3. The device according to claim 1, wherein the one or more colliders enable two or more different 3D feedback features.

4. A system for controlling a 2D application in a mixed reality application, the system comprising:
   the device for controlling a 2D application in a mixed reality application according to claim 1; and
   a presentation device configured to present the mixed reality display application to a user as mixed reality presentation.

5. The system according to claim 4, wherein the mixed reality presentation comprises a presentation of the 2D application.

6. The system according to claim 4, further comprising:
   a wearable augmented reality device; and a head-mounted display configured to present the mixed reality display application as an overlay to the reality.

7. The system according to claim 4, further comprising:
   a monitor configured to present the 2D application.

8. The system according to claim 4, further comprising at least one of:
   gesture recognition;
   voice commands;
   head tracking;
   eye tracking; and
   external devices comprising controllers, remotes, and keyboards.

9. The device according to claim 1, wherein the collider created around one or more of the interactive elements enables feedback to the user when the user interacts with the collider, the feedback comprising one or more of changing an appearance of a user interaction element, audio feedback, visual feedback, and haptic feedback.

10. A method for controlling a 2D application in a mixed reality application, the method comprising:
   receiving data representative of a 2D application, wherein the 2D application comprises interactive elements that provide commands for user control of the 2D application;
   identifying and extracting the interactive elements in the 2D application, based on the data representative of the 2D application, by executing an interactive elements identification routine comprising:
      detecting the interactive elements based on image processing of the 2D application,
      detecting changes in the 2D application when moving a position indicator amongst the interactive elements in the 2D application,
      recording locations of interaction activity by the user with the interactive elements in the 2D application, and
      providing a training dataset comprising the interaction activity and
      recognizing the interactive elements in the 2D application based on machine learning of the training dataset;
   translating the interactive elements to user interface features of a mixed reality display application, wherein translating comprises creating one or more colliders around one or more of the interactive elements;
   presenting the mixed reality display application with the interactive elements to users as mixed reality;
   receiving user input for one or more of the user interface features of the mixed reality display application;
   mapping i) the user input for the user interface features of the mixed reality display application to ii) the commands provided by the interactive elements of the 2D application for user control of the 2D application; and
   providing the commands to the 2D application in order to control the 2D application.

11. The method according to claim 10, further comprising:
   providing a presentation of the mixed reality display application comprising the user interface features;
   wherein the user input is based on the presentation of the mixed reality display application.

12. The method according to claim 10, wherein the one or more colliders enable two or more different 3D feedback features.

13. The method according to claim 10, further comprising receiving:

display data for presenting the 2D application; or a sequence of images acquiring image data of a presentation of the 2D application.

14. A non-transitory computer-readable storage medium having stored a computer program comprising instructions, which, when executed by a processor, cause the processor to:

receive data representative of a 2D application, wherein the 2D application comprises interactive elements that provide commands for user control of the 2D application;

identify and extract the interactive elements in the 2D application, based on the data representative of the 2D application, by executing an interactive elements identification routine comprising:

detecting the interactive elements based on image processing of the 2D application, detecting changes in the 2D application when moving a position indicator amongst the interactive elements in the 2D application, recording locations of interaction activity by the user with the interactive elements in the 2D application, and providing a training dataset comprising the interaction activity and recognizing the interactive elements in the 2D application based on machine learning of the training dataset;

translate the interactive elements to user interface features of a mixed reality display application, wherein translating comprises creating one or more colliders around one or more of the interactive elements;

presenting the mixed reality display application to users as mixed reality;

receive user input for one or more of the user interface features of the mixed reality display application;

map i) the user input for the user interface features of the mixed reality display application to ii) the commands provided by the interactive elements of the 2D application for user control of the 2D application; and provide the commands to the 2D application in order to control the 2D application.

15. The non-transitory computer-readable storage medium according to claim 14, wherein the instructions, when executed by the processor, further cause the processor to:

provide a presentation of the mixed reality display application comprising the user interface features;

wherein the user input is based on the presentation of the mixed reality display application.

16. The non-transitory computer-readable storage medium according to claim 14, wherein the one or more colliders enable two or more different 3D feedback features.

17. The non-transitory computer-readable storage medium according to claim 14, wherein the instructions, when executed by the processor, further cause the processor to receive:

display data for presenting the 2D application; or a sequence of images acquiring image data of a presentation of the 2D application.

\* \* \* \* \*